United States Patent
Hillman

(10) Patent No.: US 11,170,533 B1
(45) Date of Patent: Nov. 9, 2021

(54) METHOD FOR COMPRESSING IMAGE DATA HAVING DEPTH INFORMATION

(71) Applicant: Weta Digital Limited, Wellington (NZ)

(72) Inventor: Peter M. Hillman, Wellington (NZ)

(73) Assignee: Weta Digital Limited, Wellington (NZ)

( * ) Notice: Subject to any disclaimer, the term of this patent is extended or adjusted under 35 U.S.C. 154(b) by 0 days.

(21) Appl. No.: 17/140,846

(22) Filed: Jan. 4, 2021

Related U.S. Application Data

(60) Provisional application No. 63/057,239, filed on Jul. 27, 2020.

(51) Int. Cl.
*G06T 9/00* (2006.01)
*G06T 15/10* (2011.01)

(52) U.S. Cl.
CPC .............. *G06T 9/00* (2013.01); *G06T 15/10* (2013.01); *G06T 2210/21* (2013.01)

(58) Field of Classification Search
CPC ........................................................ G06T 9/00
See application file for complete search history.

(56) References Cited

U.S. PATENT DOCUMENTS

| | | | |
|---|---|---|---|
| 2004/0183795 A1* | 9/2004 | Deering ................ | G06T 15/005 345/419 |
| 2014/0104267 A1* | 4/2014 | Amsinck ............... | G06T 15/405 345/419 |
| 2015/0317765 A1* | 11/2015 | Haw ......................... | G06T 9/00 345/420 |
| 2016/0140689 A1* | 5/2016 | Lux ......................... | H04N 19/93 345/420 |
| 2017/0345120 A1* | 11/2017 | Seiler ........................ | G06T 1/60 |
| 2019/0066371 A1* | 2/2019 | Saleh ...................... | G06T 15/80 |

* cited by examiner

*Primary Examiner* — Phi Hoang
(74) *Attorney, Agent, or Firm* — Haynes and Boone, LLP; Philip H. Albert

(57) ABSTRACT

An image dataset is compressed by combining depth values from pixel depth arrays, wherein combining criteria are based on object data and/or depth variations of depth values in the first pixel image value array and generating a modified image dataset wherein a first pixel image value array represented in a received image dataset by the first number of image value array samples is in turn represented in the modified image dataset by a second number of compressed image value array samples with the second number being less than or equal to the first number.

24 Claims, 8 Drawing Sheets

METHOD FOR COMPRESSING IMAGE DATA HAVING DEPTH INFORMATION

CROSS-REFERENCES TO PRIORITY AND RELATED APPLICATIONS

This application claims the benefit of, and priority from, U.S. Provisional Patent Application No. 63/057,239 filed Jul. 27, 2020, entitled "Method for Compressing Image Data Having Depth Information."

The entire disclosure of the application recited above is hereby incorporated by reference, as if set forth in full in this document, for all purposes.

FIELD

The present disclosure generally relates to methods and apparatus for efficiently storing image data and more particularly to compressing image data that contains depth information.

BACKGROUND

For computer-generated imagery or computer-enhanced imagery, whether individual images or video sequences of images sometimes referred to as frames, might be stored in computer memory such that computer systems, such as animation creation systems, renderers, projectors, etc. can access that imagery and operate on it or present it. In a basic representation, an image is stored in a form of a two-dimensional (2D) pixel array where each element or sample of the pixel array corresponds to a position on the image and has a pixel value. The value is intended to capture a quantity of interest at such a location, for example, a color or other pixel component value.

An image management system, as might be part of an animation creation system, might generate a pixel array with more information per pixel than just an ultimate pixel color value that might be displayed for a given pixel, or a pixel array might even omit color values and store other values on a per pixel basis. A "deep image" might refer to a stored representation of an image that includes pixel values for different depths of a pixel. With such a deep image representation, instead of just a pixel value for a pixel area of the camera viewing frame, the deep image representation might include a plurality of pixel values, with different ones of the plurality representing pixel values at different depths.

An image might be computer-generated from a scene description that describes virtual objects, lighting, effects, a camera position, a camera orientation, a camera viewing frame, etc. in a three-dimensional (3D) virtual space. An image generator, such as a renderer, might compute pixel color values based on which objects are intersected by rays from the camera position through pixel areas of the camera viewing frame. In an example, a scene description might specify the positions, shapes, texture, and colors of various objects and a renderer could generate an image of what the scene would look like from a specified camera position through a specified camera viewing frame. Such a generated image might not show a far object if that far object is further from the camera position than a near object and both the far object and the near object are intersected by a viewing ray from the camera position through a pixel or pixels of the viewing frame.

A deep image representing a scene might occupy a large amount of computer memory if there are a large number of pixels, a large number of possible pixel values, and a large number of objects present in a scene description for which the deep image is generated. This can be addressed by flattening the deep image to preserve only a resulting pixel value from contributions of objects at different depths along each pixel ray. However, once flattened, the image might not contain sufficient information to allow for editing the image to remove or add objects without introducing undesirable artifacts.

A method and apparatus for compressing a deep image while retaining structure that allows for easy editing of the deep image is desirable.

SUMMARY

A computer-implemented method might be provided for compressing image data that includes depth information, the method comprising under the control of one or more computer systems configured with executable instructions, obtaining an image dataset in computer-readable form, wherein image data in the image dataset comprises a plurality of pixel image value arrays, wherein a first pixel image value array having a first number of image value array samples each having an image value, a depth value, and an association with an associated pixel position, determining, for the first number of image value array samples, a compressed image, determine, for the first number of image value array samples, a compressed image value array comprising a second number of compressed image value array samples, wherein the second number is less than or equal to the first number and wherein compressed image value array samples are computed from the first number of image value array samples and combining criteria, wherein the combining criteria are based on object data and/or depth variations of depth values in the first pixel image value array, and generating a modified image dataset wherein the first pixel image value array represented in the image dataset by the first number of image value array samples is represented in the modified image dataset by the second number of compressed image value array samples.

An image value array sample might include an object identifier, wherein an object identifier is an indication of an object that is associated with the pixel image value array sample and that provides the image value and depth value for the image value array sample. Having object identifiers can allow for a compressor or a decompressor to process data based on object identifiers, such as combining samples during compression when their object identifiers indicate that all of the samples are from one object. For example, the combining criteria for combining a first plurality of uncompressed samples of the first pixel image value array by a compressed sample in the compressed image value array might include whether each of the first plurality of uncompressed samples share an object identifier in common.

Where object identifiers are present, the combining criteria may be configured to combine adjacent samples if they have the same object identifier. However, in some cases, that might over-compress an image. If object identifiers are present, and required, the criteria might be to combine adjacent samples that are within an error threshold and share a common object identifier.

Image values of samples of the first number of image value array samples might comprise pixel values, wherein the compressed image value array samples comprise pixel values, and wherein the image dataset and the modified image dataset comprise pixel values for pixels over an image. A pixel value might comprise one or more pixel color value.

The compressed image value array might be computed from the first number of image value array samples based on depth values associated with the pixel image value array samples, and wherein the combining criteria for combining a first plurality of uncompressed samples of the first pixel image value array by a compressed sample in the compressed image value array includes whether each of the first plurality of uncompressed samples have a depth value within a predefined limited depth range threshold.

The combining criteria might further comprise determining that each object represented by samples within the predefined limited depth range threshold all share the object identifier in common.

The image dataset might comprise data for a two-dimensional pixel array of R rows and C columns, R and C being positive integers, wherein the image data comprises R times C pixel image value arrays, one per pixel, wherein a number of image value array samples in image value arrays may vary, wherein each image value array sample comprises a pixel component value, an alpha value, a depth value or depth range, and each image value array sample is associated with one of the R times C pixels of the image data, and wherein the modified image dataset comprises R times C (or more or fewer compressed image value arrays), wherein at least some of the pixel image value arrays are stored in a compressed version with fewer image value array samples relative to an uncompressed version.

The method might further comprise omitting at least one compressed image value array corresponding to a pixel not intersected by any objects.

The first pixel image value array might comprise array samples each having depth information that indicates, for its associated pixel, one or more contributing object that contribute to a color value of the associated pixel, wherein the contributing object is represented by a depth or a depth range.

The contributing object might be contributing to the first pixel color when a position of the contributing object intersects or is within a ray or volume defined by bounds rays from a camera position through a corresponding pixel.

The method might further comprise determining an error threshold between a second pixel value function derived from the compressed image value array and the first pixel image value array, adding an additional sample to the compressed image value array to reduce an error below the error threshold, determining whether modifying a depth range of an object in the first pixel image value array would reduce an error between a second pixel value function derived from the compressed image value array and the first pixel image value array, determining whether the error exceeds an error threshold, modifying the depth range to extend a boundary of adjacent objects to reduce a gap between the adjacent objects that when combined separately from the gap would reduce the error, and/or truncating the compressed image value array at a truncation sample representing an object that fully occludes farther objects at a pixel location of the compressed image value array.

A computer system comprising one or more processors and a storage medium storing instructions, which when executed by the at least one processor, might cause the system to implement methods described herein.

A non-transitory computer-readable storage medium storing instructions, which when executed by at least one processor of a computer system, might cause the computer system to carry out methods described herein.

A computer-readable medium carrying instructions, which when executed by at least one processor of a computer system, might cause the computer system to carry out methods described herein.

A carrier medium might carry image data that includes depth information compressed according to methods described herein.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
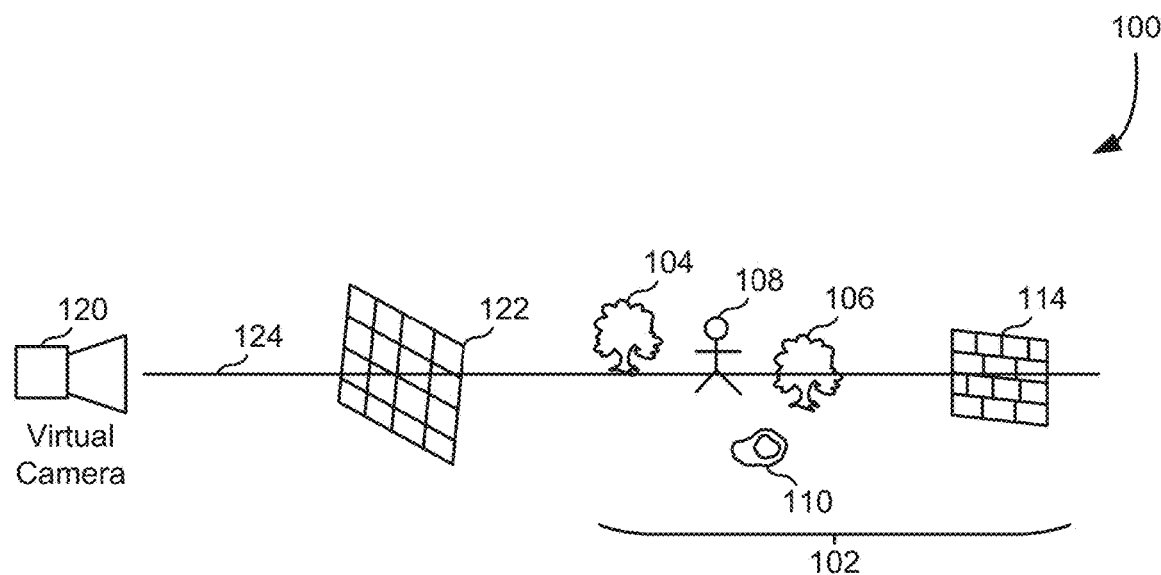
FIG. 1 illustrates a process used to compute deep image data as might represent a virtual scene, in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a basic representation, an image is stored in a form of a two-dimensional (2D) pixel array where each element or sample of the pixel array corresponds to a position on the image and has a pixel value. The value is intended to capture a quantity of interest at such a location, this is sometimes a color, although it could also be its geometric position relative to a known coordinate system, or potentially the orientation of a normal or tangent at such a location. Other values can be used such as object identifiers, temperature, altitude, mass density, velocity of travel at the time the picture was taken and so on. Further, multiple color or other values can be stored for each sample, beyond just the orthogonal set of attributes. The pixel value might have a single component value or might have a plurality of component values, and might more generally be referred to as an image value. The image can be displayed by coloring pixels of a display according to each pixel's image value that correspond to positions of the display.

But one specific example is a stored representation of an image that is a rectangular image of R rows by C columns wherein the stored representation includes R×C pixel color values, each of which might comprise three or more component color values. When R and/or C are large, the resulting data structure or file containing the stored representation can be large, and require considerable computer memory to manage, bandwidth to transmit, and computing resources to process. Where compression is feasible, the stored representation might be a compressed form of the pixel component values of the pixel array. A pixel value might comprise more than just pixel color values, and in some embodiments, the pixel value might be a scalar or vector value that does not include color values. More generally, what is being compressed are pixel values of the pixel array where pixel values of a given pixel comprise one or more component values related to values applicable to that given pixel.

As discussed above, an image generator, such as a renderer, might compute pixel component values based on which objects are intersected by rays from the camera position through pixel areas of the camera viewing frame. In an example, a scene description might specify the positions, shapes, texture, colors, etc. of various objects and a renderer could generate an image of what the scene would look like from a specified camera position through a specified camera viewing frame. Such a generated image might not show a far object if that far object is further from the camera position than a near object and both the far object and the near object are intersected by a viewing ray from the camera position through a pixel or pixels of the viewing frame. In some cases, such as where the near object is partially translucent or only covers a portion of a given pixel's area in the generated image, the resulting pixel color value for that given pixel might be a combination of color from the near object and color from the far object that can be partially seen at that given pixel. In a logical representation of an image, a pixel might have a nonzero area and a pixel cone or pyramid might be considered instead of a ray. In the general case, the camera position might be a point located in the 3D virtual scene space, a pixel is an area that is a portion of the camera viewing frame (which would represented as part of the resulting image representing a view from the camera position through the camera viewing frame), and a pixel color value represents color from objects that are within a volume swept out by rays that pass from the camera position through points within the pixel area. Thus, a pixel color value might be determined by sampling several rays through the pixel area, or determining what virtual objects are present, or partly present, within the swept-out volume.

In one interpretation, a stored pixel value, P, for a depth, D, for a pixel at image location (X, Y) might represent a pixel color that would be seen at pixel location (X, Y) in the image but for objects that are intersected by a ray from the camera position through pixel location (X, Y) when those objects are at a depth of less than D. With a stored representation of pixel component values at multiple depths, it might then be a simple matter to appear to "remove" objects from an image.

In an example, consider a scene description where a ray from the camera position through a pixel, P1, or the area thereof, passes through a first opaque object, O1, at a depth D1 and passes through a second opaque object, O2, at a depth D2, where D1<D2. A simple image would show a pixel of object O1 at pixel P1. A deep image might store color values for both objects and their corresponding depths. From such a deep image, an operator of an image processing system or other user could specify that objects at depths of D3 or less where D1<D3 should be removed. An image generation system has enough information to "remove" object O1, which can appear to be done in the image by using the stored pixel component value for (P1, D2) instead of the stored pixel component value for (P1, D1). As a result, a deep image can be useful when working with images generated from 3D scene descriptions or other 3D representations where changes are desired after the image is generated.

A deep image might be represented by data corresponding to pixels in image space. The deep image might be generated from virtual objects described in a scene space and then by rendering, or otherwise, is represented in an image dataset that might specify, for example, for each pixel in a pixel array, a pixel image value array. Each entry in the pixel image value array might comprise a pixel sample representing a pixel component value, an optional alpha value, a depth value or a depth range, and an object identifier identifying which object contributes that component/alpha at the specified depth. The pixel image value array might be associated with a particular pixel by an explicit reference to an associated pixel position or the particular pixel might be determinable by a position of the pixel image value array within the image dataset. In other variations, object identifiers are not used.

Some object identifiers in samples might indicate a combination of details, such as a model (e.g., a datum that conveys "This sample is contributed by pencil #45 in this scene.") and a material (e.g., the datum more specifically conveys that the sample is of the lead, wood, or painted surface of pencil #45). Object details of a sample might convey multiple object identifiers, such as one for the instance, one for the model, and one for the material, or the object identifier might be a single datum that encodes for all of these, as in a code number that conveys "this sample is of the paint on a blunt pencil and it is pencil #23 in this scene." Where a sample's object identifiers comprises multiple object identifiers, the criteria for compression might specify that all of the identifiers of two samples must match if those two samples are to be combined in compression.

Object identifiers might be assigned programmatically and/or manually. For example, an artist might specify that a main character is given an object identifier of "ID-1", any other character is given an object identifier of "ID-2" and everything else is given an object identifier of "ID-3." In some cases, a user might manually generate identifiers specifically for compression. Giving objects the same identifier might cause a compression process to combine them together, and where that is desirable, a user might give them the same object identifier, even if they are considered distinct objects in other contexts. This might allow for improved compression where distinctions between certain objects is less important than greater compression performance. These assignments can be done after or before a render step, before a compression step.

In a specific example, a scene description might describe tree objects in a forest of trees. An image dataset might be provided to a user that is a deep image rendered from the scene. The user might specify which trees are to be removed from the scene as a running character is added into the scene. With each object's contribution to a pixel component value provided by the deep image dataset, removing some trees can be done by searching the image dataset for pixel image value array samples, over all the pixel image value arrays, that have object identifiers equal to the object identifiers of the trees to be removed. Samples can be added of the character to the pixel image value arrays of pixels intersected by the character at the depth of the character in the scene. As each pixel image value array might be an arbitrarily long list of data, compression can be useful to make handling of large image datasets easier. For example, within in an image there might be thousands of array samples for a given pixel (or there could be as low as zero samples for some pixels).

FIG. 1 illustrates a process used to compute deep image data as might represent a virtual scene, in an embodiment. As illustrated, capturing 100 of data related to a virtual scene can involve virtual objects 102 placed in a scene space, such as a tree 104, a tree 106, a person 108, a rock 110, and a brick wall 114. To generate an image of the virtual scene, an image-generating computer would compute which virtual objects 102 are visible from a camera 120 at a camera position through pixels of a view frame 122 by computing which objects intersect a ray 124 running between the camera position and a z-depth point toward the back of the image through a given pixel. For a deep image, rather than just storing a single color value (or color vector in a color space) or some non-color value, the deep image might include pixel values for objects at different depths along ray 124. In this example, where brick wall 114 covers the entire pixel, any objects that are further from the camera than brick wall 114 can be ignored. Alternatively, they might be included in the depth image to provide for the case where brick wall 114 might be moved in editing. In some embodiments, more than one ray is used per pixel and a combination method is used to derive the data for the deep image. In some embodiments, a deep pixel data structure represents accumulating color effects from a camera position to a z-depth point on a ray from the camera position (which can be cut off once the ray intersects a totally opaque object that encompasses all of the pixel), while in other embodiments, a deep pixel data structure represents accumulating color effects from the z-depth point to the camera position.

Figure 2:
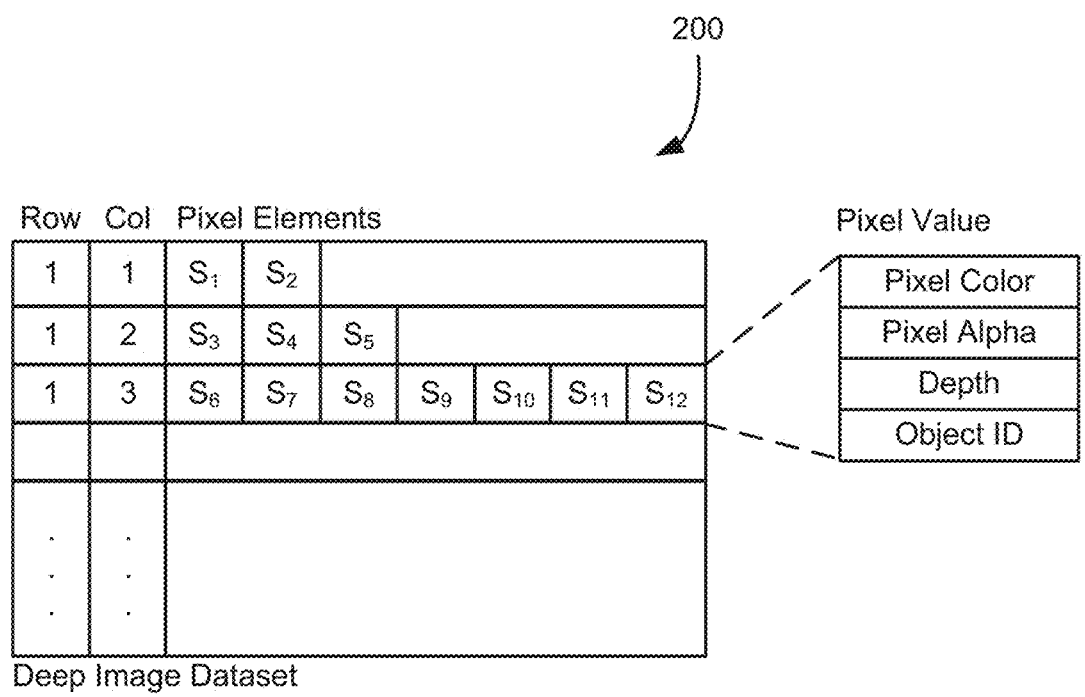
FIG. 2 illustrates a data structure that might be used to store a deep image dataset representing a deep image of a virtual scene, in an embodiment.

FIG. 2 illustrates a data structure that might be used to store a deep image dataset 200 representing a deep image of a virtual scene, in an embodiment. Deep image dataset 200 might include one row per pixel of a deep image, possibly omitting unused pixels. As illustrated, each pixel might be represented by one or more pixel samples, indicated as $S_1$, $S_2$, in FIG. 2. In that example, the pixel at location (1, 1) in the image has an array comprising two pixel samples, the pixel at location (1, 2) in the image has an array comprising three pixel samples, and the pixel at location (1, 3) in the image has an array comprising seven pixel samples. Each pixel sample might contain data indicating a pixel color (which could be a single value, three values, or some other representation of a pixel component value), a pixel alpha (which might range from 0.0 to 1.0 to indicate a degree of transparency), a depth representing a distance from a camera position to an object that is contributing color to that pixel, and an object identifier identifying that object. While the contributions of objects in these examples are pixel colors, it may be that other attributes of objects may be used instead of, or in addition to, color. The length of a pixel image value array might be one or more image value array samples, each having an image value, a depth value, and an association with an associated pixel position. The pixel position might be explicit, as illustrated in the data structure of FIG. 2, or might be implied by the data structure used to store the pixel image value arrays. As the number of samples in a pixel image value array might be large for a deep image of a large number of objects and/or complex objects, the deep image dataset might be large and require a large amount of memory to store, bandwidth to transfer, and computational resources to process.

A pixel value array might store pixel samples in the form of an ordered list of sample data elements where each sample specifies a color and a transparency, which can combine together over the list from front-to-back, without necessarily assigning a depth value to each sample. In an embodiment, a "depth-less" array might have samples stored with color, transparency (e.g., an alpha value), and an object identifier. In that embodiment, if every object is given a unique identifier, then an object can be easily removed from an image dataset by searching the image dataset for samples that have their object identifier equal to that of the object to be removed and removing those samples them from the image dataset. This can be effective even in the case of a transparent object. If that is the only edit that will take place, there might be no need to store depth values. Alternatively, the depth for samples could be stored as depth values in a sample data element, but it can be a distance value or some other metric, even a cardinal metric. For example, an image dataset that corresponds to an electronic version of cel animation might store a layer number for each sample, where the largest layer number corresponds to the bottom-most layer and the smallest the top. Each sample data element of a deep pixel would then contain a list of layers that are not blank at that pixel's location.

A pixel value array might store pixel samples in the form of a list of sample data elements where some sample data elements contain the same depth value, corresponding to multiple samples that are at the same depth. One use for this might be for scenes where objects are reflected in a mirror. They might all appear at the same depth (that of the mirror) while being encoded separately. This makes sense when extra information is stored, and that information is different for each reflected object. For example, a secondary depth channel might be stored to indicate a distance that an object is from the mirror, or separate IDs for each object. A compression process might consider an additional constraint to prevent combining those objects if that was desirable (e.g., avoiding combinations of samples from different objects, or using the secondary depth channel to combine objects) but at some step in the procedure, it may be desirable to collapse all those samples together into one.

A pixel value array might store pixel samples related to hidden objects. A hidden object can be stored in a deep image dataset, perhaps by allowing for objects to be stored behind totally opaque objects that totally obscure the hidden object. In such cases, deep pixels might not be automatically truncated at solid objects. This can be used in the case where there is an expectation that close objects will be removed. This can be helpful in cases where it is difficult to do this in a renderer or when multiple renders are being combined into one render, by retaining samples that end up behind solid objects from the other render.

Merging two images is a common application for deep images and the methods and apparatus described herein might find utility in such cases. For example, suppose there is a render of trees and a render of an animal in the forest. Merging the images might take into account that the animal should occlude trees that are behind it and should be occluded by trees in front of it.

In a general case, compression might attempt to anticipate what edits might be made to an image and produce the small set of samples that would produce an acceptably similar result when comparing edits using the compressed image to edits using the original. Compression might result in a much smaller file. But if the compression takes into account what edits might be made, and an ultimate flat image that results from editing the compressed file post-compression results in the same results as editing the uncompressed file and flattening it, the compression might be considered lossless. In one example, a compression process might be designed with the assumption that the only edits that will take place are inserting new objects into a scene at some unknown depth or editing the color of an individual object. In that case, samples with different object IDs are not combined, but close together samples are, because it can be assumed that objects will not be inserted between two very close objects.

As explained above, what might be lossy compression might end up being lossless or nearly lossless. In addition to such compression, completely lossless compression might also be included, which would be lossless regardless of the editing done. Such a lossless compression might include representing the same information using fewer bytes on disk or in a file or data structure. An example might be the use of a lossless Lempel-Ziv-Welch (LZW) compression process on rows of pixel arrays. While no compression process can losslessly output a smaller output for every input bitstream, image datasets nearly always have some structure that permits lossless compression in most cases. For example, in an image it is often the case that the color for a pixel is the same as, or close to, the color of an adjacent pixel. Minor adjustments to depth, color, transparency, etc. of multiple pixels might lead to better compression performance, and so smaller storage requirements. For example, multiple pixels might represent the samples using the same set of depths and tweaking the values might ensure the correct end result. A lossless compression process might take into account a repeated pattern of depth values and so assign a short bit pattern to represent that data.

Some compression processes might consider tradeoffs of constant bit-rate versus constant quality. A compression constraint might favor one over the other, e.g., "use as many samples as required to reduce errors to below a predetermined threshold", or "limit each pixel array to ten samples" or "limit the arrays in a row of pixels to no more than 10,000 samples" as alternative or additional constraints. This might lead to quite bad errors in some places, but it could force a limit on the file size and processing time for an image. A per-row limit might require processing multiple pixels in one operation, starting with one sample for each pixel, scanning which pixel has the biggest error, then adding an extra sample to that pixel, and repeating the procedure until the sample limit is reached, stopping early if a minimum error is achieved and carrying on above the limit of samples if there is a maximum error set.

The latter might be used when combining two heavy volume renders. In a worst case, the combined image is the combined size of the input images, but there could be a mode for compressing the merged output so the merged image only has as many samples as the larger of the two inputs. Other variations should be apparent upon reading this disclosure.

Figure 3:
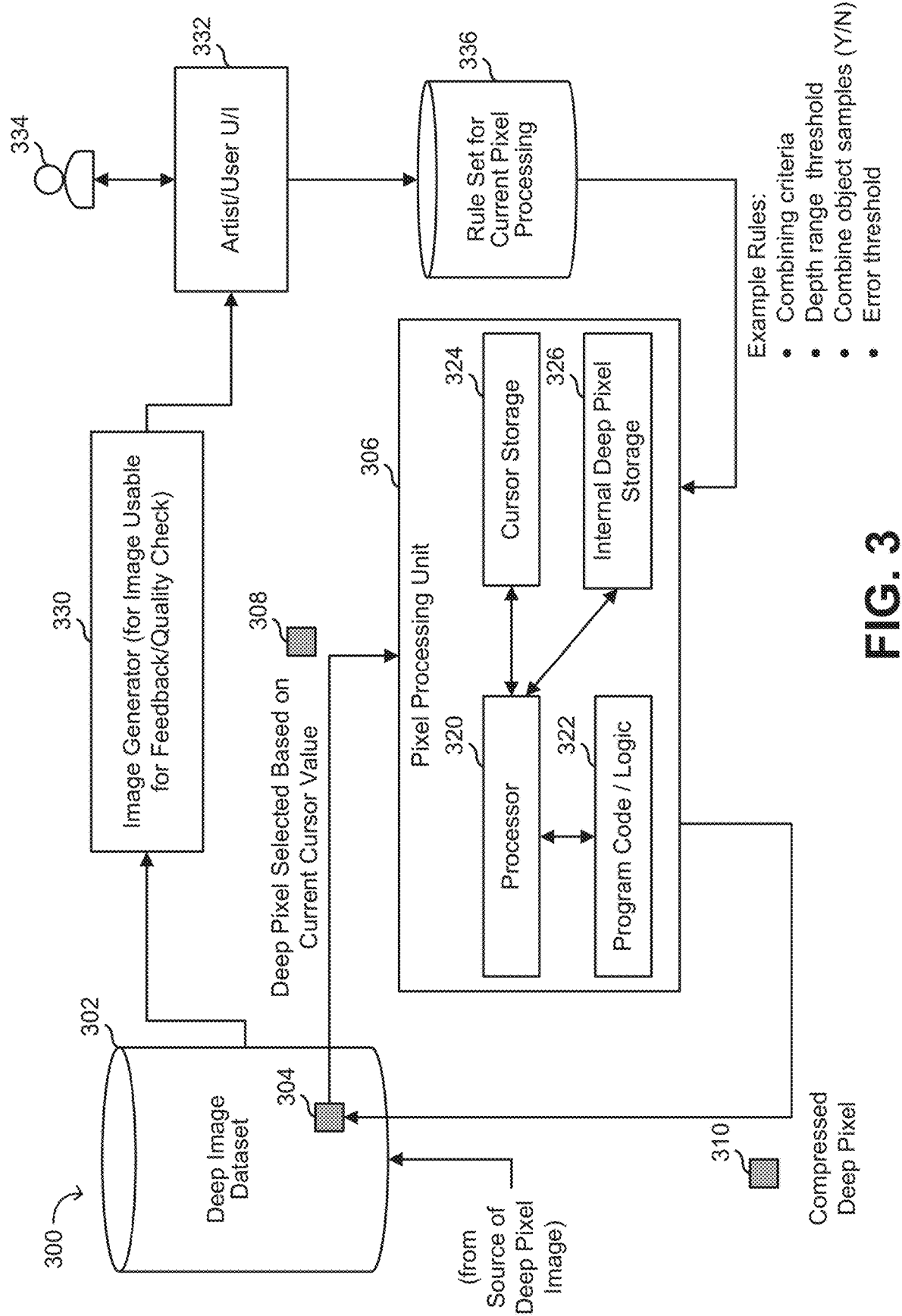
FIG. 3 illustrates a system for compressing an image dataset of a deep image to form a compressed image dataset of the deep image, in an embodiment.

FIG. 3 illustrates a system 300 for compressing an image dataset of a deep image to form a compressed image dataset of the deep image, in an embodiment. System 300 is shown including a deep image dataset store 302 for storing a deep image dataset, a pixel processing unit 306 for processing a deep image dataset, an artist/user UI 332, and a rule set store 336.

A user 334 may interact with UI 332 to define a set of rules indicating how an image dataset should be compressed. The rules may indicate, for example, criteria for combining samples in a pixel image value array, a depth range threshold under which samples should be combined, whether object samples should be combined, and/or an error threshold (e.g., an error threshold between pixel component value functions) under which the results of the compression operation should remain. The rules may be stored in rule set store 336 for current pixel processing. The rules might apply to one pixel or multiple pixels and rule set store 336 can be accessed by pixel processing unit 306 as needed.

Figure 4:
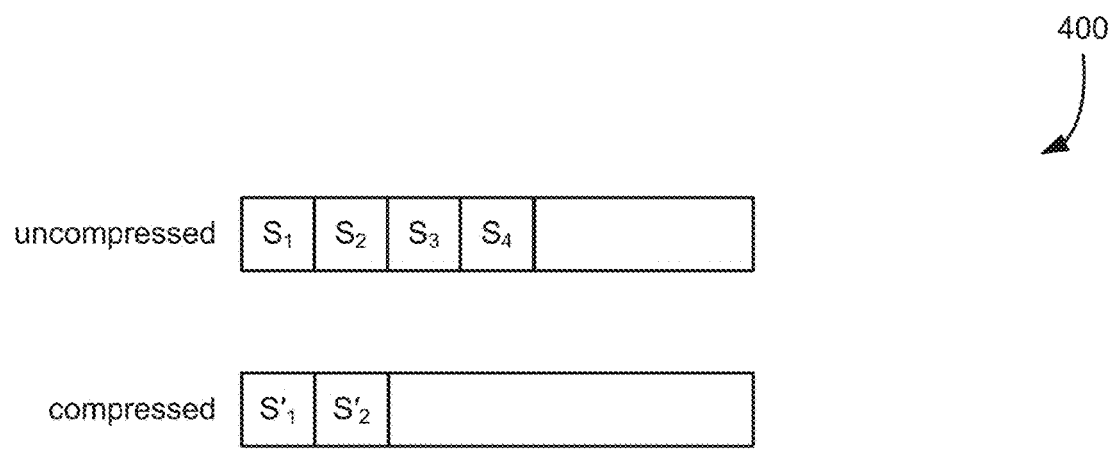
FIG. 4 illustrates an example of compression of a deep image pixel image value array, in an embodiment.

Deep image dataset store 302 can store image data as a plurality of pixel image value arrays, as illustrated in FIG. 4. Deep image dataset store 302 might be loaded with data from a source of a deep pixel image data (e.g., a file, a stream, etc.). As shown, deep image dataset store 302 may include an uncompressed pixel image value array corresponding to a deep pixel 304. Pixel processing unit 306 may compress the uncompressed pixel image value array and replace an uncompressed pixel image value array corresponding to deep pixel 304 with a compressed pixel image value array. Pixel processing unit 306 may compress a portion of, or all of the pixels in a deep image dataset in the same fashion, and make the pixels (e.g., the entire deep image dataset) available to consumers of the deep pixels.

Pixel processing unit 306 is shown including a processor 320 that executes program code 322 to compress deep pixels from an input deep image dataset. Pixel processing unit 306 may use a cursor to iterate through deep pixels in the deep image dataset and compress a current pixel image value array corresponding to a current deep pixel (e.g., by combining samples in the pixel image value array), then process other deep pixels. A currently-selected deep pixel is represented by pixel 308 in FIG. 3. For example, pixel processing unit 306 may initiate a compression process (such as that described in detail with respect to FIG. 8) by setting the cursor to point to the first pixel in the deep image dataset. The first pixel may be deep pixel 304 shown. Based on rules defined in the rule set in rule set store 336 for current pixel processing, pixel processing unit 306 may compress the pixel image value array corresponding to pixel 308. While processing (e.g., compressing) pixel 308, pixel processing unit 306 may store the cursor pointing to pixel 308 in a cursor store 324, and pixel 308 (e.g., a pixel image value array corresponding to the current pixel) might be stored in an internal deep pixel storage 326. Once pixel processing unit 306 has finished compressing pixel 308, it may store a resulting compressed pixel 310 in deep image dataset store 302. For example, a compressed pixel image value array corresponding to deep pixel 304 may be used to overwrite the uncompressed pixel image value array, or alternately, the compressed pixel image value array may be stored in a new deep image dataset.

Pixel processing unit 306 may then move the cursor to the next pixel in the deep image data set and compress it, repeating the process until at least a portion of the pixels in the deep image dataset has been compressed, or until some other termination criteria is met. The resulting compressed image might be generated by an image generator 330 and sent to a display of artist/user UI 332 to allow user 334 to inspect the results.

FIG. 4 illustrates an example 400 of compression of a deep image pixel image value array, in an embodiment. In the example shown there of one pixel image value array, the uncompressed version of the pixel image value array might comprise four pixel samples, $S_1$, $S_2$, $S_3$, and $S_4$. If these four pixel samples can be represented well enough by two pixel samples, $S_1'$ and $S_2'$, less memory would be required to store the pixel image value array. As a specific example, if $S_1$, $S_2$, and $S_3$ are pixel samples referring to an object, such as tree 104 (see FIG. 1) and $S_4$ is a pixel sample referring to another object, such as person 108 (see FIG. 1), then $S_2'$ can be set equal to $S_4$ and $S_1'$ can be computed by a merger of the three pixel color contributions of tree 104. If an editor wishes to edit a deep image by removing tree 104, using the uncompressed version of the pixel image value array, the editor could delete $S_1$, $S_2$, and $S_3$ and if the editor wishes to edit the deep image by removing person 108, the editor could delete $S_4$ from the uncompressed version of the pixel image value array. The same edits could be done just as easily with the compressed version of the pixel image value array, but with less memory requirements.

Figure 5:
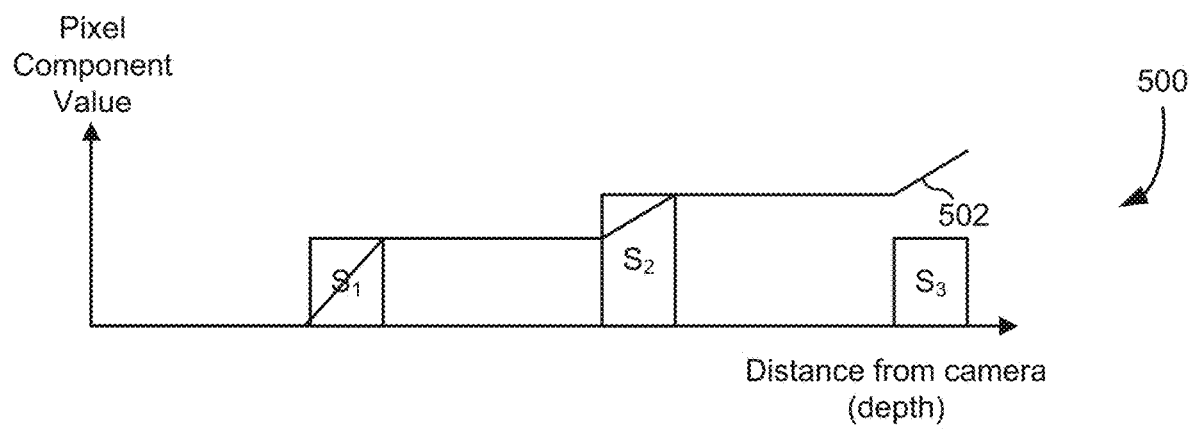
FIG. 5 illustrates a representation of pixel values as a function of depth for an example pixel, in an embodiment.
Figure 5:
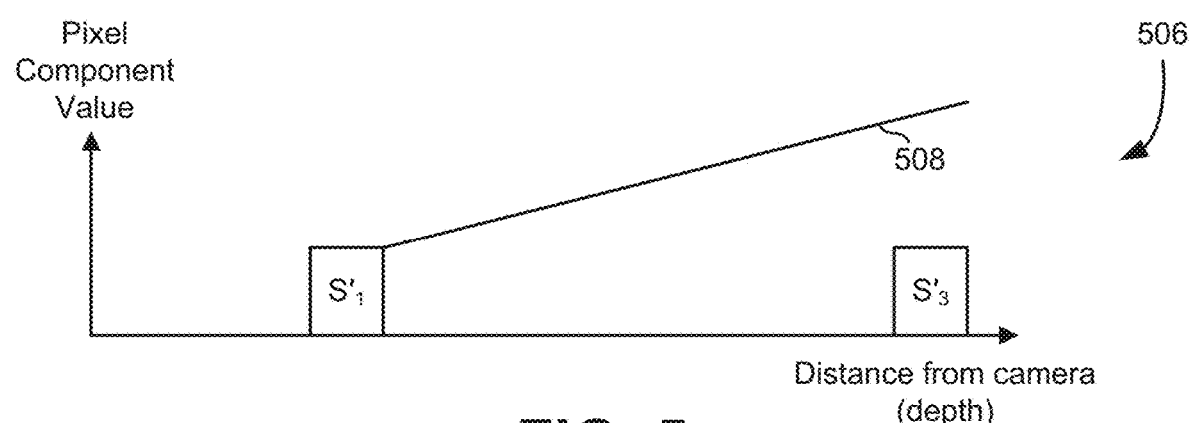

FIG. 5 illustrates a representation 500 of pixel values as a function of depth for an example pixel, in an embodiment. For illustration purposes, only one dimension for pixel values is shown. It should be understood that for a given pixel, there might be multiple such representations, such as one per color dimension and one for transparency. In a specific example, pixel colors might have three dimensions, such as for (RGB color encoding), four dimensions, such as (RGBα—three colors and a transparency value), or fewer or more dimensions. Thus, the vertical axis in the illustrations might correspond to color intensity, alpha value, or some other value for a deep pixel that varies with depth. In some embodiments, a type of compression might vary based on a type of data being compressed, such as one type of compression for color values, another type for velocity values, yet another type for normals, etc.

An image processing computer might process a pixel image value array as a representation of what is plotted in FIG. 5. In that example, there are three pixel samples in the pixel image value array, $S_1$, $S_2$, and $S_3$. In one instance of determining, for example, a color of a pixel at varying distances from a camera point, and accumulation curve 502 represents color intensity or some other pixel component value for a deep pixel that can vary with depth accumulated over various samples. As illustrated, in the distance from the camera to the sample for a first object encountered in a pixel, there is no color contribution, and at a depth of the first object (corresponding to pixel sample $S_1$), there is some color contribution.

In representation 506, $S_1$, $S_2$, and $S_3$ are instead represented by $S_1'$ and $S_3'$. The pixel component values can be set such that an accumulation curve 508 is similar to accumulation curve 502 at the beginning and ending depths, or some other values. While in some examples, the samples and their heights represent a pixel color at various depths, the samples and accumulation curves could represent some pixel component other than color.

In the examples depicted in the figures, a summation of samples over depth might be represented as an accumulation curve that is a piecewise linear curve stored in memory as an ordered series of vertices and thus an accumulation curve might be displayed as a plot of a change in image data versus depth. In other cases, the accumulation from the front of a sample to the back of a sample (or from the back to front in the case where accumulation is done from most distant to least distant). A contribution of a sample within the sample as a function of depth might be linear as depicted in the figures, with a slope that corresponds to the height of the sample, but could also be, in places, a nonlinear curve based on the samples of the input pixel. For example, the Y-axis scales could be logarithmic. The increase in the accumulation curve over the thickness of a sample might be an exponential curve, such as one where it rises exponentially according to the Beer-Lambert law, in which case exponential rises might be depicted as linear slopes. Other schemes might be used and might depend on the type of volumetric object being depicted (e.g., fog, smoke, water). In some instances where a sample is approximating motion-blurred objects moving towards a camera, the linear slope might be more accurate. A data structure storing a deep pixel might include a field to indicate, perhaps on a per-sample basis, which kind of process to use and a field to indicate how to treat the changing accumulation value across the depth thickness of the sample. Thus, the accumulation curves may be shown drawn as linear slopes in the figures, indicating that the values increase linearly throughout each sample, but other functions are possible and might be depicted differently. Individual samples could be tagged to indicate their preferred function, or an entire deep pixel or image might be tagged to indicate the function to use for all of that deep pixel or image. Some functions might employ additional per-sample values to shape the accumulation curve accordingly.

Figure 6:
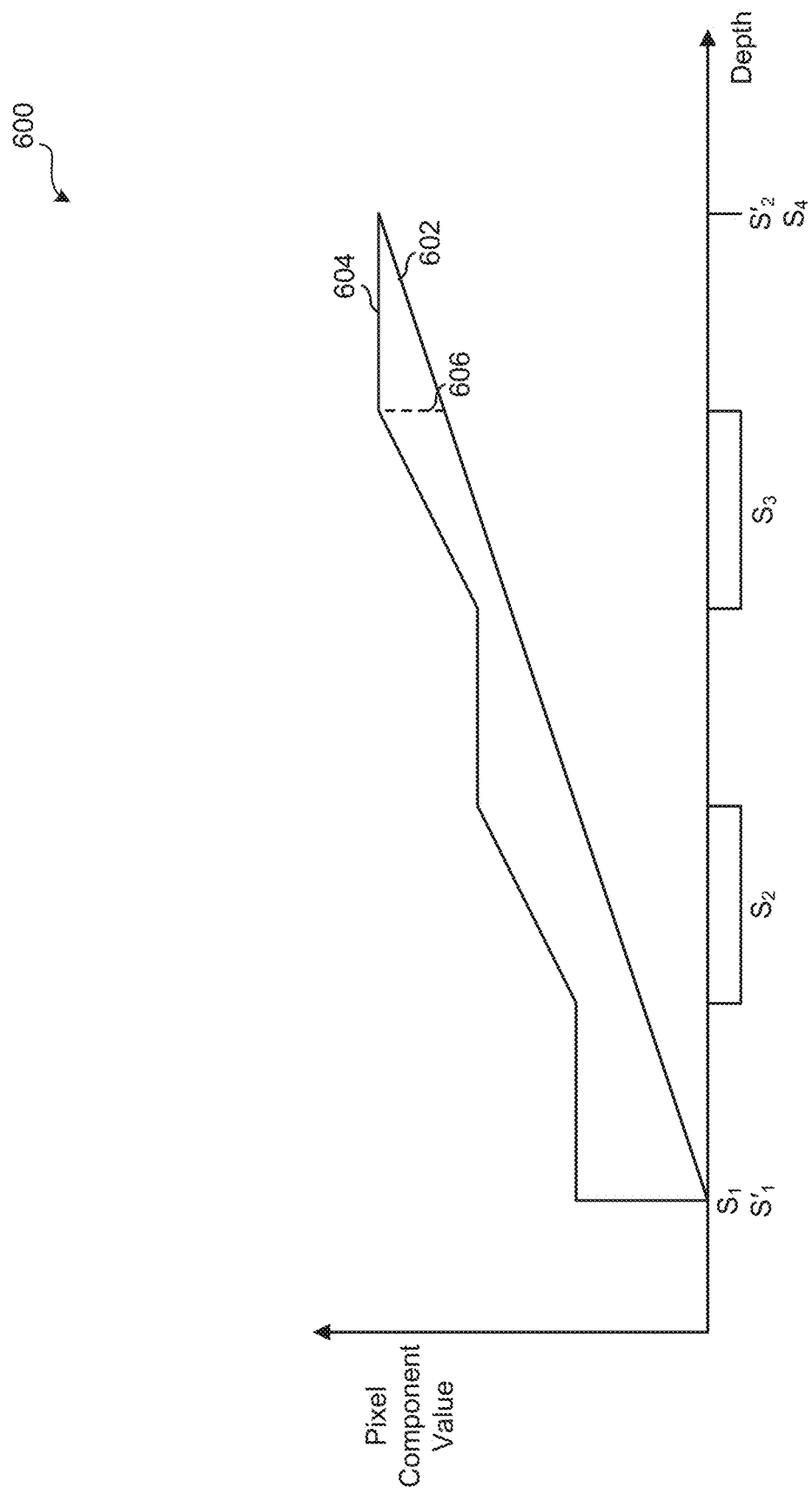
FIG. 6 illustrates a representation of pixel values as a function of depth for an example pixel and differences between compressed values and uncompressed values, in an embodiment.

FIG. 6 illustrates a representation 600 of pixel component values as a function of depth for an example pixel and differences between compressed values and uncompressed values, in an embodiment. A similar approach can be used for pixel component values other than color. A first accumulation curve 602 represents a pixel component value as a function of depth when using the compressed values and a second accumulation curve 604 represents a pixel component value as a function of depth when using the uncompressed values. In this example, the uncompressed version has four samples and the compressed version has two samples. Dashed line 606 indicates a difference between the two. Where a compressed deep image dataset is being created, a compression module, such as pixel processing unit 306 implemented in software or hardware, may consider the error values of the differences. In cases where the error value exceeds an error threshold, an additional pixel sample can be added (or one from the uncompressed version left in). That way, using the compressed deep image dataset, the differences in pixel values would be less than the error threshold.

In some embodiments, depth ranges associated with the samples might be modified to reduce an error between the two pixel component value functions, of the compressed image value array and uncompressed image value array, such as when an error exceeds an error threshold. Modification might be that the depth range is adjusted to extend a boundary of adjacent objects to reduce a gap between the adjacent objects that when combined separately from the gap would reduce the error.

In addition to easier handling of the data, rendering might be accelerated using a compressed image dataset. However, it is desirable that the compression be done to remain useful for downstream editors and to avoid unnecessary artifacts. Artifacts might occur where compression of a pixel image value array would result in significant visual changes relative to using an uncompressed pixel image value array and/or where compression would introduce undesirable effects from a pixel to nearby pixels.

In some embodiments, transitions might be included by thickening the samples corresponding to array samples when merging samples, to reduce the number and/or effects of hard transitions among a group of objects that are close together in depth. An example is illustrated in FIG. 7.

Figure 7:
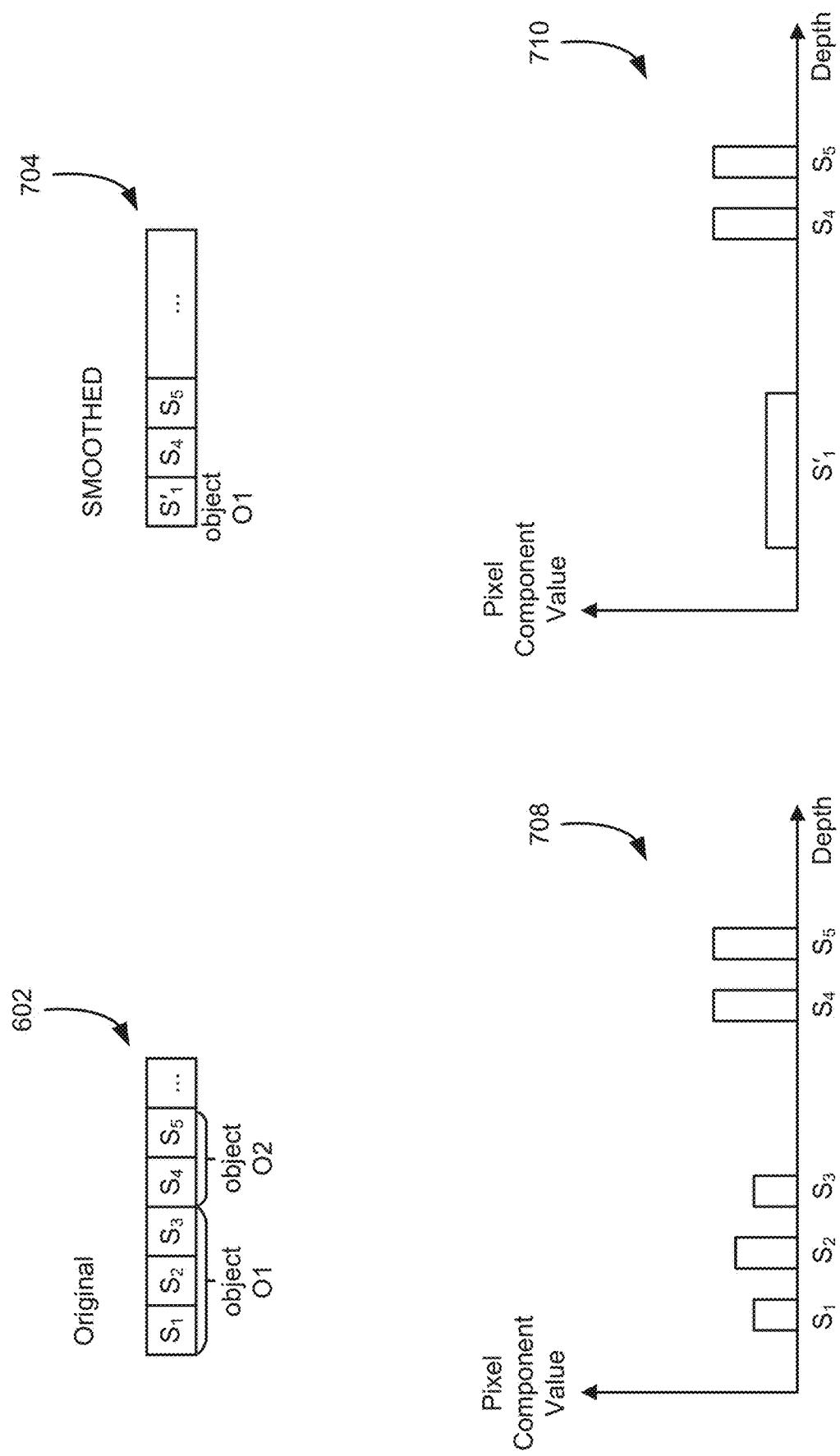
FIG. 7 illustrates an example of smoothing done to a representation of pixel values as a function of depth for an example pixel, in an embodiment.

FIG. 7 illustrates an example of smoothing done to a representation of pixel component values as a function of depth for an example pixel, in an embodiment. As illustrated there, a pixel image value array 702 has a number of samples and the first three samples ($S_1$, $S_2$, $S_3$) are portions of the same object. To save space, possibly reduce artifacts, and for other reasons, those samples are replaced with a single sample, $S_1'$ to form a pixel image value array 704. A plot 708 illustrates color samples as a function of depth for pixel image value array 702 and a plot 710 illustrates color samples as a function of depth for pixel image value array 704.

Figure 8:
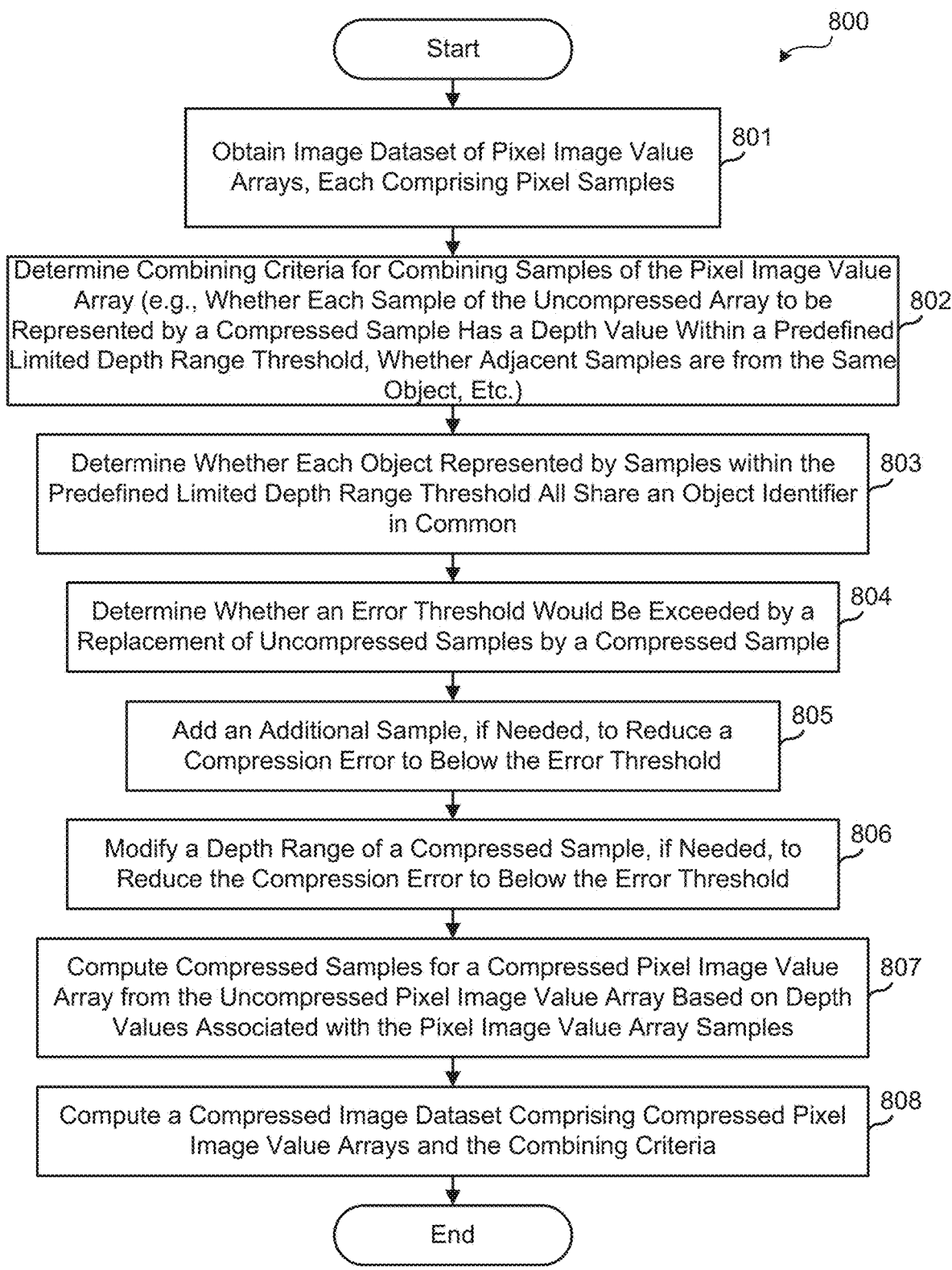
FIG. 8 is a flowchart of an exemplary method as might be performed by an image processor to modify an image dataset of a deep image to form a compressed image dataset of the deep image, in an embodiment.

FIG. 8 is a flowchart of an exemplary method 800 as might be performed by an image processor to modify an image dataset of a deep image to form a compressed image dataset of the deep image. In step 801, the image processor might obtain an image dataset of pixel image value arrays, each comprising pixel samples, that form an uncompressed image dataset usable for a deep image. In step 802, the image processor might determine what combining criteria for combining samples of the pixel image value array to use, such as whether each uncompressed sample to be represented by a compressed sample has a depth value within a predefined limited depth range threshold, whether adjacent samples are from the same object, etc. as described elsewhere herein. In step 803, the image processor might determine whether each object represented by samples within the predefined limited depth range threshold of a deep pixel all share an object identifier in common and indicate that such samples might be combined. In step 804, the image processor might determine whether an error threshold would be exceeded upon a replacement of a plurality of uncompressed samples by a compressed sample. In step 805, the image processor might add an additional sample, if needed, to reduce a compression error to below the error threshold. In step 806, the image processor might modify a depth range of a compressed sample, if needed, to reduce the compression error to at or below the error threshold. In step 807, the image processor might compute compressed samples for a compressed pixel image value array (a deep pixel) from the uncompressed pixel image value array based on depth values associated with the pixel image value array samples. In step 808, the image processor might compute a compressed image dataset comprising compressed pixel image value arrays and the combining criteria.

In this manner, the image processor can obtain an image dataset in computer-readable form, wherein image data in the image dataset comprises a plurality of pixel image value arrays, wherein a first pixel image value array having a first number of image value array samples each having an image value, a depth value, and an association with an associated pixel position, determine, for the first number of image value array samples, a compressed image value array comprising a second number of compressed image value array samples, wherein the second number may be less than or equal to the first number and wherein compressed image value array samples may be computed from the first number of image value array samples and combining criteria, wherein the combining criteria may be based on object data and/or depth variations of depth values in the first pixel image value array, and generate a modified image dataset wherein the first pixel image value array represented in the image dataset by the first number of image value array samples is represented in the modified image dataset by the second number of compressed image value array samples.

The second number may be equal to the first number in cases where it is not possible to reduce the number of samples while meeting the criteria.

In an embodiment, the image processor might process the first pixel image value array by determining a second pixel image value array having a single sample that might represent all of the samples in the first pixel image value array, then determine whether that single sample is sufficient to represent the corresponding deep pixel and if not, add additional samples to the second pixel image value array to reduce an error or potential error. Adding an additional sample might comprise splitting a sample. Splitting a sample might comprise determining whether splitting criteria are present. In a different variation, instead of combining and splitting, samples from the first array are selectively combined to form samples in the second array after checking that criteria are met.

An example of a splitting criterion is to split a sample when an error difference between an accumulation curve of the first pixel image value array varies from an accumulation curve of the second pixel image value array by more than a predetermined error threshold. In one test, this might be that the accumulation curves do not differ by more than the predetermined error threshold at any depth, which could preserve an ability for a user to generate a flat image for any desired depth without excessive artefacts or reconstruct a pixel value array for use in editing a deep image.

Another example of a splitting criterion is to split a sample if the sample in the second pixel image value array represents multiple objects, in which case the sample might be split into separate samples for distinct objects (but those samples might still represent multiple samples from the first pixel image value array if they are all from the same object). Yet another example of a splitting criterion is to split a sample if the sample in the second pixel image value array represents samples from the first pixel image value array that differ in depth by more than a predetermined depth threshold, in which case the sample might be split into separate samples for smaller depth ranges per sample (but might still represent multiple samples from the first pixel image value array if they are all within the depth threshold).

In a specific implementation, the image processor loops through the samples of the first pixel image value array, checks that adjacent samples from different objects were not combined and splits them if they were. For depth checking, the image processor might generate a combined list of front depth and back depth of the samples of the first array (the uncompressed array) and do the same for the second array (the to-be-compressed array). For each depth in the first array, the image processor might find a closest depth in the second array and find a largest such distance between samples. If that distance is above a predetermined threshold, the image processor might split the samples of the second array at that depth, insert a new sample with a new depth into the second array, and repeat.

In a specific implementation, the image processor performs a hybrid combination of Ramen-Douglas-Peucker greedy processing and a salient points processing, but other approaches might be done.

A sample might include a pixel image value that corresponds to an RGBA value for the pixel. The image processor might compute a reconstruction function of a pixel that is an RGBA value obtained by clipping the pixel at a given depth, z. This reconstruction function might be obtained by compositing each sample closer than z together, using the "over" operator in depth order, or other method. If the depth z is contained within a sample, the image processor might split it into two samples at depth z, and composite only the front-most segment of that sample. In an embodiment, pixel values comprise color values and color values are combined using an "over" operation.

The image processor might implement a Douglas-Peucker-based or similar type process and compute a difference between a reconstruction function of the first array and the second array, and find a point where difference (perhaps defined as a total absolute difference of all channels of interest) is at a maximum. If that maximum is above a threshold, the image processor might find a sample from the first array that is closest to being in the middle of difference, and divide at that depth. This need not be the depth at which the two functions differ the most, which is likely to be very close to the front of the sample.

In one embodiment, the image processor might also implement a salient points process in addition to, or instead of, other processes. In the salient points process, the image processor might compute an optimal set of samples that produce a reconstruction function that differs by less than a predetermined other threshold and work recursively. An example process might operate according to the following pseudocode:

```
optimal_compress(firstSample,lastSample) returns
    set_of_samples:
    for nextSample in range (firstSample+1) to (last-
        Sample−1):
        compute combination of all samples between first-
            Sample and nextSample into one single sample
        compute Reconstruction function between first-
            Sample and nextSample and find max error
            between original list and new compressed single
            sample
        if maximum reconstruction error below threshold:
            call optimal_compress(nextSample,lastSample)
                and store {nextSample+set_of_samples} along
                with reconstruction error
    return whichever {nextSample+set_of_samples} has few-
        est samples. If there's a tie, use the one with smallest
        reconstruction error.
```

Using the above approach, the image processor might speed up a search process by knowing maximum error. In a hybrid approach, a second, higher threshold is used, and the image processor uses a Douglas-Peucker-based process to create a very compressed dataset that is below that second threshold. Once that is achieved, the image processor can further independently divide each compressed sample using the salient points process to get down below a lower threshold. The result need not be optimal. In another approach, a depth-based error metric is used instead of a difference of reconstruction function metric.

Figure 9:
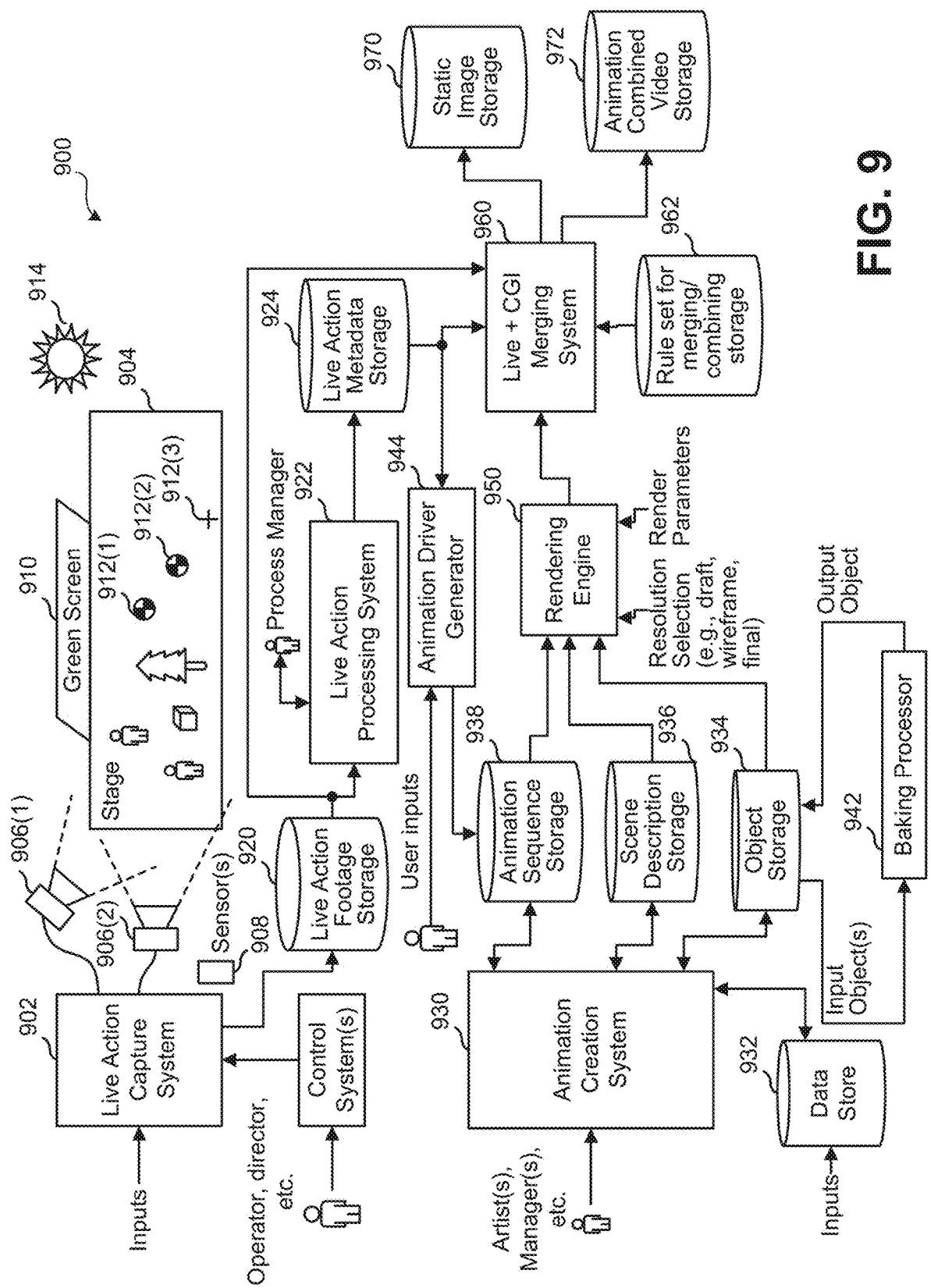
FIG. 9 illustrates an example visual content generation system as might be used to generate imagery in the form of still images and/or video sequences of images, according to various embodiments.
Figure 10:
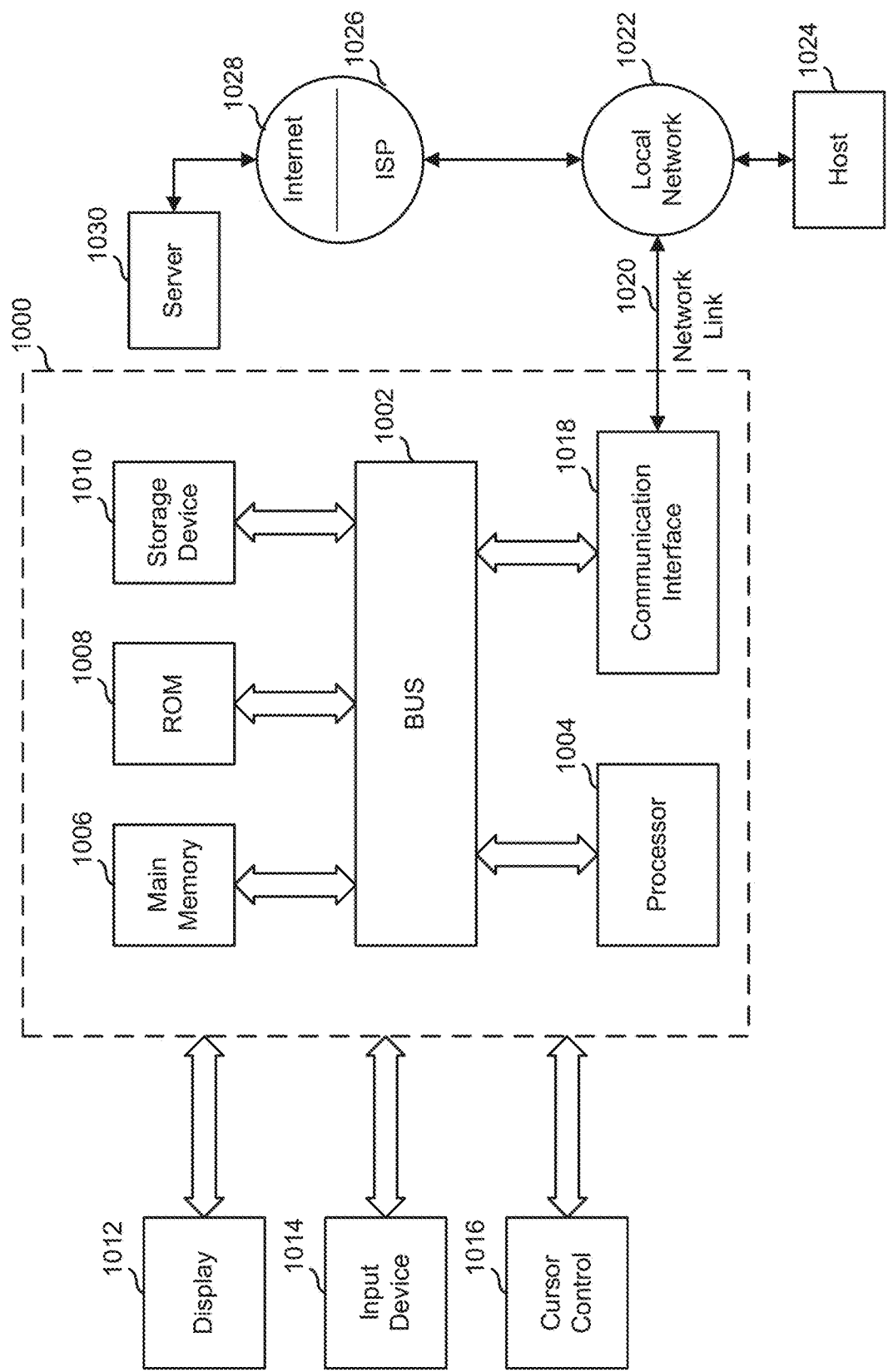
FIG. 10 is a block diagram illustrating an example computer system upon which computer systems of the system illustrated in FIGS. 3 and 9 may be implemented.

The visual content generation system 900 (see FIG. 9) is configured to generate and process deep images, whether compressed or uncompressed and may be implemented by software executing on one or more computer systems (e.g., each like a computer system 1000 illustrated in FIG. 10). One embodiment might involve a carrier medium carrying image data that includes depth information that is compressed using methods described herein. The carrier medium might comprise any medium suitable for carrying the compressed image data, including a storage medium, e.g., a solid state memory, an optical disk or a magnetic disk, or a transient medium, e.g., a signal carrying the compressed image data such as a signal transmitted over a network, a digital signal, a radio frequency signal, an acoustic signal, an optical signal or an electrical signal.

For example, FIG. 9 illustrates the example visual content generation system 900 as might be used to generate imagery in the form of still images and/or video sequences of images. Visual content generation system 900 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 9, a live action capture system 902 captures a live scene that plays out on a stage 904. Live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap") detectors, etc.). On stage 904, there might be human actors, animal actors, inanimate objects, background objects, and possibly an object such as a green screen 910 that is designed to be captured in a live scene recording in such a way that it is easily overlaid with computer-generated imagery. Stage 904 might also contain objects that serve as fiducials, such as fiducials 912(1)-(3), that might be used post-capture to determine where an object was during capture. A live action scene might be illuminated by one or more lights, such as an overhead light 914.

During or following the capture of a live action scene, live action capture system 902 might output live action footage to a live action footage storage 920. A live action processing system 922 might process live action footage to generate data about that live action footage and store that data into a live action metadata storage 924. Live action processing system 922 might include computer processing capabilities, image processing capabilities, one or more processors, program code storage for storing program instructions executable by the one or more processors, as well as user input devices and user output devices, not all of which are shown. Live action processing system 922 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 914, as that might be useful in post-processing to match computer-generated lighting on objects that are computer-generated and overlaid on the live action footage. Live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of visual content generation system 900. Animation creation system 930 might include computer processing capabilities, image processing capabilities, one or more processors, program code storage for storing program instructions executable by the one or more processors, as well as user input devices and user output devices, not all of which are shown. Animation creation system 930 might be used by animation artists, managers, and others to specify details, perhaps programmatically and/or interactively, of imagery to be generated. From user input and data from a database or other data source, indicated as a data store 932, animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 930 might be interactive, allowing a user to read in animation sequences, scene descriptions, object details, etc. and edit those, possibly returning them to storage to update or replace existing data. As an example, an operator might read in objects from object storage into a baking processor 942 that would transform those objects into simpler forms and return those to object storage 934 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 932 might be used to drive object presentation. For example, if an artist is creating an animation of a spaceship passing over the surface of the Earth, instead of manually drawing or specifying a coastline, the artist might specify that animation creation system 930 is to read data from data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene. Animation driver generator 944 might generate corresponding animation parameters to be stored in animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 922. Animation driver generator 944 might convert that movement data into specifications of how joints of an articulated CGI character are to move over time.

A rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 950 might include computer processing capabilities, image processing capabilities, one or more processors, program code storage for storing program instructions executable by the one or more processors, as well as user input devices and user output devices, not all of which are shown.

Visual content generation system 900 can also include a merging system 960 that merges live footage with animated content. The live footage might be obtained and input by reading from live action footage storage 920 to obtain live action footage, by reading from live action metadata storage 924 to obtain details such as presumed segmentation in captured images segmenting objects in a live action scene from their background (perhaps aided by the fact that green screen 910 was part of the live action scene), and by obtaining CGI imagery from rendering engine 950.

A merging system 960 might also read data from rulesets for merging/combining storage 962. A very simple example of a rule in a ruleset might be "obtain a full image including a two-dimensional pixel array from live footage, obtain a full image including a two-dimensional pixel array from rendering engine 950, and output an image where each pixel is a corresponding pixel from rendering engine 950 when the corresponding pixel in the live footage is a specific color of green, otherwise output a pixel value from the corresponding pixel in the live footage."

Merging system 960 might include computer processing capabilities, image processing capabilities, one or more processors, program code storage for storing program instructions executable by the one or more processors, as well as user input devices and user output devices, not all of which are shown. Merging system 960 might operate autonomously, following programming instructions, or might have a user interface or programmatic interface over which an operator can control a merging process. In some embodiments, an operator can specify parameter values to use in a merging process and/or might specify specific tweaks to be made to an output of merging system 960, such as modifying boundaries of segmented objects, inserting blurs to smooth out imperfections, or adding other effects. Based on its inputs, merging system 960 can output an image to be stored in a static image storage 970 and/or a sequence of images in the form of video to be stored in an animated/combined video storage 972.

Thus, as described, visual content generation system 900 can be used to generate video that combines live action with computer-generated animation using various components and tools, some of which are described in more detail herein. While visual content generation system 900 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 10 is a block diagram that illustrates a computer system 1000 upon which the computer systems of the systems described herein and/or visual content generation system 900 (see FIG. 9) may be implemented. Computer system 1000 includes a bus 1002 or other communication mechanism for communicating information, and a processor 1004 coupled with bus 1002 for processing information. Processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 may also be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a computer monitor, for displaying information to a computer user. An input device 1014, including alphanumeric and other keys, is coupled to bus 1002 for communicating information and command selections to processor 1004. Another type of user input device is a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a network connection. A modem or network interface local to computer system 1000 can receive the data. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be a network card, a modem, a cable modem, or a satellite modem to provide a data communication connection to a corresponding type of telephone line or communications line. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world-wide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020, and communication interface 1018. In the Internet example, a server 1030 might transmit a requested code for an application program through the Internet 1028, ISP 1026, local network 1022, and communication interface 1018. The received code may be executed by processor 1004 as it is received, and/or stored in storage device 1010, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for compressing image data that includes depth information, the method comprising:
   under the control of one or more computer systems configured with executable instructions:
      obtaining an image dataset in computer-readable form, wherein image data in the image dataset comprises a plurality of pixel image value arrays, wherein a first pixel image value array having a first number of image value array samples each having an image value, a depth value, and an association with an associated pixel position;
      determining, for the first number of image value array samples, a compressed image;
      determining, for the first number of image value array samples, a compressed image value array comprising a second number of compressed image value array samples, wherein the second number of compressed image value array samples is less than or equal to the first number of image value array samples and wherein compressed image value array samples are computed from the first number of image value array samples and combining criteria, wherein the combining criteria are based on object data and/or depth variations of depth values in the first pixel image value array;
      generating a modified image dataset wherein the first pixel image value array represented in the image dataset by the first number of image value array samples is represented in the modified image dataset by the second number of compressed image value array samples;
      determining an error threshold between a second pixel color value function derived from the compressed image value array and the first pixel image value array; and
      adding an additional sample to the compressed image value array to reduce an error below the error threshold.

2. The computer-implemented method of claim 1, wherein image values of samples of the first number of image value array samples comprise pixel color values, wherein the compressed image value array samples comprise pixel color values, and wherein the image dataset and the modified image dataset comprise pixel color values for pixels over an image.

3. The computer-implemented method of claim 1, wherein the compressed image value array is computed from the first number of image value array samples based on depth values associated with the pixel image value array samples, and wherein the combining criteria for combining a first plurality of uncompressed samples of the first pixel image value array by a compressed sample in the compressed image value array includes whether each of the first plurality of uncompressed samples have a depth value within a predefined limited depth range threshold.

4. The computer-implemented method of claim 1, further comprising obtaining object identifiers associated with the pixel image value array samples, wherein samples of the first pixel image value array include an associated object identifier, and wherein the combining criteria for combining a first plurality of uncompressed samples of the first pixel image value array by a compressed sample in the compressed image value array includes whether each of the first plurality of uncompressed samples share a shared object identifier in common.

5. The computer-implemented method of claim 4, wherein the combining criteria further comprise determining that each object represented by samples within a predefined limited depth range threshold all share the shared object identifier in common.

6. The computer-implemented method of claim 1, wherein the image dataset comprises data for a two-dimensional pixel array of R rows and C columns, R and C being positive integers, wherein the image data comprises R times C pixel image value arrays, one per pixel, wherein a number of image value array samples in image value arrays may vary, wherein each image value array sample comprises a corresponding sample pixel color value, a corresponding sample alpha value, a corresponding sample depth value or corresponding sample depth range, and the image value array sample is associated with one of the R times C pixels of the image data, and wherein at least some image value arrays of the modified image dataset comprise fewer image value array samples relative to the image dataset.

7. The computer-implemented method of claim 1, wherein generation of a compressed sample is performed using a compression step selected based on a type of data being compressed.

8. The computer-implemented method of claim 1, wherein pixel values comprise color values and the color values are combined using an "over" operation.

9. The computer-implemented method of claim 1, further comprising omitting at least one compressed image value array corresponding to a pixel not intersected by any objects.

10. The computer-implemented method of claim 1, wherein the first pixel image value array comprises array samples each having sample depth information that indicates, for its associated pixel, one or more contributing object that contribute to a color value of the associated pixel, wherein the contributing object is represented by a contributing depth or a contributing depth range.

11. The computer-implemented method of claim 10, the contributing object is contributing to the color value of the associated pixel when a position of the contributing object intersects, or is within a ray or volume defined by bounds rays from, a camera position through a corresponding pixel.

12. The computer-implemented method of claim 1, further comprising truncating the compressed image value array at a truncation sample representing an object that fully occludes farther objects at a pixel location of the compressed image value array.

13. A computer system comprising at least one processor and a storage medium storing instructions, which when executed by the at least one processor, cause the computer system to implement the method of claim 1.

14. A non-transitory computer-readable storage medium storing instructions, which when executed by at least one processor of a computer system, causes the computer system to carry out the method of claim 1.

15. A non-transitory computer-readable medium carrying instructions, which when executed by at least one processor of a computer system, causes the computer system to carry out the method of claim 1.

16. A non-transitory carrier medium carrying image data that includes image data depth information compressed according to the method of claim 1.

17. A computer-implemented method for compressing image data that includes depth information, the method comprising:

under the control of one or more computer systems configured with executable instructions:
obtaining an image dataset in computer-readable form, wherein image data in the image dataset comprises a plurality of pixel image value arrays, wherein a first pixel image value array having a first number of image value array samples each having an image value, a depth value, and an association with an associated pixel position;
determining, for the first number of image value array samples, a compressed image;
determining, for the first number of image value array samples, a compressed image value array comprising a second number of compressed image value array samples, wherein the second number of compressed image value array samples is less than or equal to the first number of image value array samples and wherein compressed image value array samples are computed from the first number of image value array samples and combining criteria, wherein the combining criteria are based on object data and/or depth variations of depth values in the first pixel image value array;
generating a modified image dataset wherein the first pixel image value array represented in the image dataset by the first number of image value array samples is represented in the modified image dataset by the second number of compressed image value array samples;
determining whether modifying a depth range of an object in the first pixel image value array would reduce an error between a second pixel color value function derived from the compressed image value array and the first pixel image value array;
determining whether the error exceeds an error threshold; and
modifying the depth range to extend a boundary of adjacent objects to reduce a gap between the adjacent objects that when combined separately from the gap would reduce the error.

18. The computer-implemented method of claim 17, wherein image values of samples of the first number of image value array samples comprise pixel color values, wherein the compressed image value array samples comprise pixel color values, and wherein the image dataset and the modified image dataset comprise pixel color values for pixels over an image.

19. The computer-implemented method of claim 17, wherein the compressed image value array is computed from the first number of image value array samples based on depth values associated with the pixel image value array samples, and wherein the combining criteria for combining a first plurality of uncompressed samples of the first pixel image value array by a compressed sample in the compressed image value array includes whether each of the first plurality of uncompressed samples have a depth value within a predefined limited depth range threshold.

20. The computer-implemented method of claim 17, further comprising obtaining object identifiers associated with the pixel image value array samples, wherein samples of the first pixel image value array include an associated object identifier, and wherein the combining criteria for combining a first plurality of uncompressed samples of the first pixel image value array by a compressed sample in the compressed image value array includes whether each of the first plurality of uncompressed samples share a shared object identifier in common.

21. The computer-implemented method of claim 20, wherein the combining criteria further comprise determining that each object represented by samples within a predefined limited depth range threshold all share the shared object identifier in common.

22. The computer-implemented method of claim 17, wherein generation of a compressed sample is performed using a compression step selected based on a type of data being compressed.

23. The computer-implemented method of claim 17, wherein the first pixel image value array comprises array samples each having sample depth information that indicates, for its associated pixel, one or more contributing object that contribute to a color value of the associated pixel, wherein the contributing object is represented by a contributing depth or a contributing depth range.

24. The computer-implemented method of claim 23, the contributing object is contributing to the color value of the associated pixel when a position of the contributing object intersects, or is within a ray or volume defined by bounds rays from, a camera position through a corresponding pixel.

* * * * *